US012125360B2

(12) United States Patent
Baker et al.

(10) Patent No.: US 12,125,360 B2
(45) Date of Patent: *Oct. 22, 2024

(54) PATIENT MONITORING SYSTEM

(71) Applicant: Palarum LLC, Lebanon, OH (US)

(72) Inventors: Patrick Baker, Lebanon, OH (US); Glenn Wolfe, Dayton, OH (US); Jeffery Ryon Steele, Trenton, OH (US)

(73) Assignee: Palarum LLC, Lebanon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,322

(22) Filed: Jul. 14, 2023

(65) Prior Publication Data

US 2024/0029536 A1 Jan. 25, 2024

Related U.S. Application Data

(63) Continuation of application No. 17/325,312, filed on May 20, 2021, now Pat. No. 11,727,781, and a continuation of application No. 16/790,168, filed on Feb. 13, 2020, now abandoned, and a continuation of application No. 16/404,787, filed on May 7, 2019, (Continued)

(51) Int. Cl.

*G08B 21/04* (2006.01)
*G08B 21/02* (2006.01)
*G08B 21/18* (2006.01)

(52) U.S. Cl.

CPC ..... *G08B 21/0446* (2013.01); *G08B 21/0236* (2013.01); *G08B 21/182* (2013.01)

(58) Field of Classification Search

None

See application file for complete search history.

(56) References Cited

U.S. PATENT DOCUMENTS

| | | | |
|---|---|---|---|
| 10,022 | A | 9/1853 | Stockwell |
| 6,156,028 | A | 12/2000 | Prescott |

(Continued)

FOREIGN PATENT DOCUMENTS

| | | | |
|---|---|---|---|
| EP | 3039891 | A1 | 7/2016 |
| KR | 10-2013-0142098 | A | 12/2013 |

(Continued)

OTHER PUBLICATIONS

English Abstract of KR 10-2013-0142098 obtained from LexisNexis Total Patent on Jan. 7, 2019.

(Continued)

*Primary Examiner* — Fekadeselassie Girma

(74) *Attorney, Agent, or Firm* — Woodard Emhardt Henry Reeves & Wagner

(57) ABSTRACT

A system for monitoring the movements or other activities of patient. Aspects include a monitoring device with one or more sensors such as a pressure or motion sensors that may be positioned on or near a patient. Alerts may be generated by the monitoring device if the sensor readings fall outside predetermined limits set in a patient profile specific to a particular patient. Sensor readings and/or alerts may be sent by the monitoring device to the central server which may notify nearby caregivers that a patient needs assistance. The server may be configured to analyze sensor readings and alert information to refine patient profiles to reduce or eliminate false alarms.

24 Claims, 6 Drawing Sheets

Related U.S. Application Data now Pat. No. 10,657,787, and a continuation of application No. 16/017,065, filed on Jun. 25, 2018, now Pat. No. 10,403,114, and a continuation of application No. 15/649,041, filed on Jul. 13, 2017, now Pat. No. 10,026,292.

(60) Provisional application No. 62/361,548, filed on Jul. 13, 2016.

(56) References Cited

U.S. PATENT DOCUMENTS

| | | | | |
|---|---|---|---|---|
| 6,377,179 | B1 | 4/2002 | Fulton | |
| 7,714,728 | B2 | 5/2010 | Koblasz | |
| 7,733,224 | B2 | 6/2010 | Tran | |
| 8,736,439 | B1 | 5/2014 | Shinozuka | |
| 8,961,439 | B2 | 2/2015 | Yang et al. | |
| 9,107,615 | B2 | 8/2015 | Buckman | |
| 9,204,796 | B2 | 12/2015 | Tran | |
| 10,022,614 | B1 | 7/2018 | Tran et al. | |
| 10,026,292 | B2 | 7/2018 | Baker et al. | |
| 10,403,114 | B2 | 9/2019 | Baker et al. | |
| 2002/0162246 | A1 | 11/2002 | Mayer et al. | |
| 2006/0137462 | A1 | 6/2006 | Divigalpitiya et al. | |
| 2006/0183980 | A1* | 8/2006 | Yang | G16H 20/60 128/920 |
| 2006/0235346 | A1 | 10/2006 | Prescott | |
| 2007/0173903 | A1 | 7/2007 | Goren et al. | |
| 2007/0203533 | A1 | 8/2007 | Goren et al. | |
| 2008/0108913 | A1 | 5/2008 | Lengsfeld et al. | |
| 2008/0287832 | A1 | 11/2008 | Collins et al. | |
| 2009/0216156 | A1 | 8/2009 | Lengsfeld et al. | |
| 2011/0015498 | A1 | 1/2011 | Mestrovic et al. | |
| 2011/0132181 | A1 | 6/2011 | Kockovic | |
| 2011/0152727 | A1 | 6/2011 | Ten Kate | |
| 2011/0304497 | A1 | 12/2011 | Molyneux et al. | |
| 2012/0226197 | A1 | 9/2012 | Sanders et al. | |
| 2012/0253234 | A1 | 10/2012 | Yang et al. | |
| 2013/0130843 | A1 | 5/2013 | Burroughs et al. | |
| 2013/0185003 | A1 | 7/2013 | Carbeck et al. | |
| 2013/0192071 | A1* | 8/2013 | Esposito | A43B 17/00 324/693 |
| 2013/0274587 | A1 | 10/2013 | Coza et al. | |
| 2014/0012161 | A1* | 1/2014 | Ross, Jr. | A41D 1/002 600/595 |
| 2014/0070042 | A1 | 3/2014 | Beers et al. | |
| 2014/0088461 | A1 | 3/2014 | Mack et al. | |
| 2014/0257047 | A1* | 9/2014 | Sillay | H04L 63/10 600/595 |
| 2014/0378872 | A1 | 12/2014 | Hong et al. | |
| 2015/0019135 | A1 | 1/2015 | Kacyvenski et al. | |
| 2015/0048949 | A1 | 2/2015 | Koblasz | |
| 2015/0156567 | A1 | 6/2015 | Oliver et al. | |
| 2015/0173666 | A1 | 6/2015 | Smith et al. | |
| 2015/0177080 | A1 | 6/2015 | Esposito et al. | |
| 2015/0190084 | A1 | 7/2015 | Johansson et al. | |
| 2015/0238124 | A1 | 8/2015 | Buckman | |
| 2015/0254956 | A1 | 9/2015 | Shen et al. | |
| 2015/0351666 | A1 | 12/2015 | Buckman | |
| 2016/0081563 | A1 | 3/2016 | Wiard et al. | |
| 2016/0134737 | A1 | 5/2016 | Pulletikurty | |
| 2016/0206242 | A1* | 7/2016 | Esposito | A61B 5/1038 |
| 2016/0219968 | A1* | 8/2016 | Martin | A61B 5/6807 |
| 2016/0338621 | A1* | 11/2016 | Kanchan | A61B 5/11 |
| 2017/0172519 | A1 | 6/2017 | Stergiou et al. | |
| 2017/0189752 | A1* | 7/2017 | Mohrman | G09B 19/0038 |
| 2017/0189757 | A1 | 7/2017 | Brothers et al. | |
| 2017/0193140 | A1 | 7/2017 | Brothers et al. | |
| 2017/0224520 | A1* | 8/2017 | Karasahin | A61B 5/11 |
| 2017/0318360 | A1 | 11/2017 | Tran et al. | |
| 2017/0319122 | A1 | 11/2017 | Wild et al. | |
| 2017/0361159 | A1 | 12/2017 | Malcolm | |
| 2018/0001184 | A1 | 1/2018 | Tran et al. | |
| 2018/0003579 | A1* | 1/2018 | Esposito | D03D 13/004 |
| 2018/0018864 | A1* | 1/2018 | Baker | G08B 21/182 |
| 2019/0099113 | A1* | 4/2019 | Röder | A61B 5/6804 |
| 2021/0280037 | A1* | 9/2021 | Baker | G08B 21/0446 |

FOREIGN PATENT DOCUMENTS

| | | |
|---|---|---|
| KR | 20130142098 | 12/2013 |
| WO | WO 2015/017712 A1 | 2/2015 |

OTHER PUBLICATIONS

Lu Jiang et al. Measuring activities and 1-15 counting steps with the SmartSocks—An unobtrusive and accurate method. IEEE 2014 Global Humanitarian Technology Conference, (2014), pp. 694-698. Retrieved from the internet on Nov. 27, 2023, URL < https://ieeexplore.ieee.org/document/6970358.

* cited by examiner

PATIENT MONITORING SYSTEM

REFERENCE TO RELATED APPLICATION

This application is a continuation of application Ser. No. 17/325,312 filed May 20, 2021, which is a continuation of application Ser. No. 16/790,168 filed Feb. 13, 2020, now abandoned, which is a continuation of application Ser. No. 16/404,787 filed May 7, 20196, now U.S. Pat. No. 10,657, 787, which is a continuation of application Ser. No. 16/017, 065, filed Jun. 25, 2018, now U.S. Pat. No. 10,403,114, which is a continuation of application Ser. No. 15/649,041, filed Jul. 13, 2017, now U.S. Pat. No. 10,026,292, which claims the benefit of U.S. Provisional Patent Application No. 62/361,548, filed Jul. 13, 2016, all of which are hereby incorporated by reference.

BACKGROUND

The risk of a patient falling from a bed, chair, or other supporting structure is an important concern for those responsible for providing patient care. While patient falls are not always serious, the possibility of additional injuries to the patient, and the potential liabilities for caregivers makes avoiding patient falls an important concern.

Patients who fall may experience considerable pain and discomfort and may require additional time to heal old injuries that have been aggravated by the fall, or new injuries caused by the event itself. For healthcare providers, patient falls generally mean additional costs, some or all of which the facility may be forced to write-off. For insurance companies, the additional risk of injury from patient falls increases costs making it generally more expensive to provide health coverage to patients and liability insurance for hospitals and caregivers.

Also, the need to prevent patient falls is generally increasing as the population ages. Age increases both the overall risk of falling and the likelihood of injury from a fall. Elderly people may be especially at risk of repeat falls which may increase the time required to heal, and result in serious or life-threatening age-related complications.

Healthcare regulations may also impact the cost of patient falls. Some government agencies may withhold funds, refuse licenses or permits, or otherwise penalize providers with higher numbers of patient falls. On the other hand, increased funding may be available to providers who reduce or eliminate incidents involving fall-related injuries.

Thus patients, caregivers, and medical institutions would benefit from predicting when a patient is about to fall and preventing it from happening rather than treating patients from the injuries they may sustain as a result.

SUMMARY

This disclosure generally relates to systems for monitoring patient activity in a hospital, clinic, nursing home, or other facility where a patient may be receiving care. More specifically, the disclosed system involves detecting patient activity and analyzing this data in real time to predict when a patient is likely to stand, which may lead to a fall, for example, from a bed, chair, or other supporting structure. When the system determines that a fall is imminent, nearby caregivers may be alerted and can then offer timely assistance thus increasing the chance of avoiding a fall before it happens.

The patient monitoring system disclosed includes a monitoring device with one or more sensors such as a pressure sensor, accelerometer, gyroscope, temperature, proximity, or sensor that may be positioned on or near a patient. The monitoring device may receive updated sensor readings and can report this information to a central server. The server may then alert caregivers who are close by informing them that the patient's activities indicate a risk of an imminent fall.

The system may make this determination by comparing sensor readings with predetermined limits set for each particular patient. In one example, a pressure sensor may be incorporated into a patient's socks. The pressure sensor may include conductive threads woven into the fabric of the sock. When the threads are stretched or compressed the resistance of the circuit may change in response and may be detected by a monitoring device. In one example, the pressure sensor is the "Smart Sock" made by TexiSense of Montceau Les Mines, France. Excessive pressure, rapid changes in pressure, or other sensor readings may signal patient movement that may be potentially harmful.

The patient monitoring device may include a transmitter configured to send sensor information and/or alarm notifications to the remote server. When an alarm condition is detected by the monitoring device, an alarm message may be sent to the server which may automatically locate one or more caregivers closest to the patient. The alarm message may be sent to these caregivers indicating that an unexpected and possibly detrimental situation has occurred, or is about to occur, prompting caregivers to move to the patient to provide assistance.

The patient monitoring system may include aspects to minimize false alarms. For example, the monitoring device may incorporate multiple sensors capable of sensing motion, acceleration, and/or changes in angle, or proximity to a target object. In another aspect, the monitoring device may store patient profile information defining alarm conditions based on combinations of data obtained during a time interval from the multiple sensors. In one example, the profile may be configured to trigger an alert when a sharp increase in pressure on a patient's foot is accompanied by an abrupt change in the angle and/or acceleration of the patient's leg relative to gravity, both occurring within a predetermined window of time. In this way, the system may be configured to differentiate the act of standing up from other movements of the legs or feet that may pose no danger to the patient.

In another aspect, patient profiles may be generated by the server based on any patient information such as demographics, physical or mental conditions, treatment history, race, gender, sex, current or past drug therapies, and others. These and other aspects may be stored in a centralized knowledge base of patient information and may be considered by the server when generating profile parameters for a give patient. Once generated, the server may communicate the profile to the corresponding monitoring device.

In another aspect, the server may include a heuristic module to analyze patient profiles and will validate the rules associated with generating alerts for patients to increase accuracy and eliminate false positives. Data considered by the heuristic module may be provided by caregivers reacting to the alarms generated thus allowing a caregiver to assist in enhancing the system's response to a patient's behavior. This information may also be used in generating new profiles.

The server may also include reporting modules that are configured to generate reports. These reports may include information showing the types and frequency of events, the number of false results, the number of falls prevented, the response times of medical personal to each alert, or any other information that is collected and utilized by the system.

Further forms, objects, features, aspects, benefits, advantages, and examples of the present disclosure will become apparent from a detailed description and drawings provided herewith.

DETAILED DESCRIPTION

Figure 1:
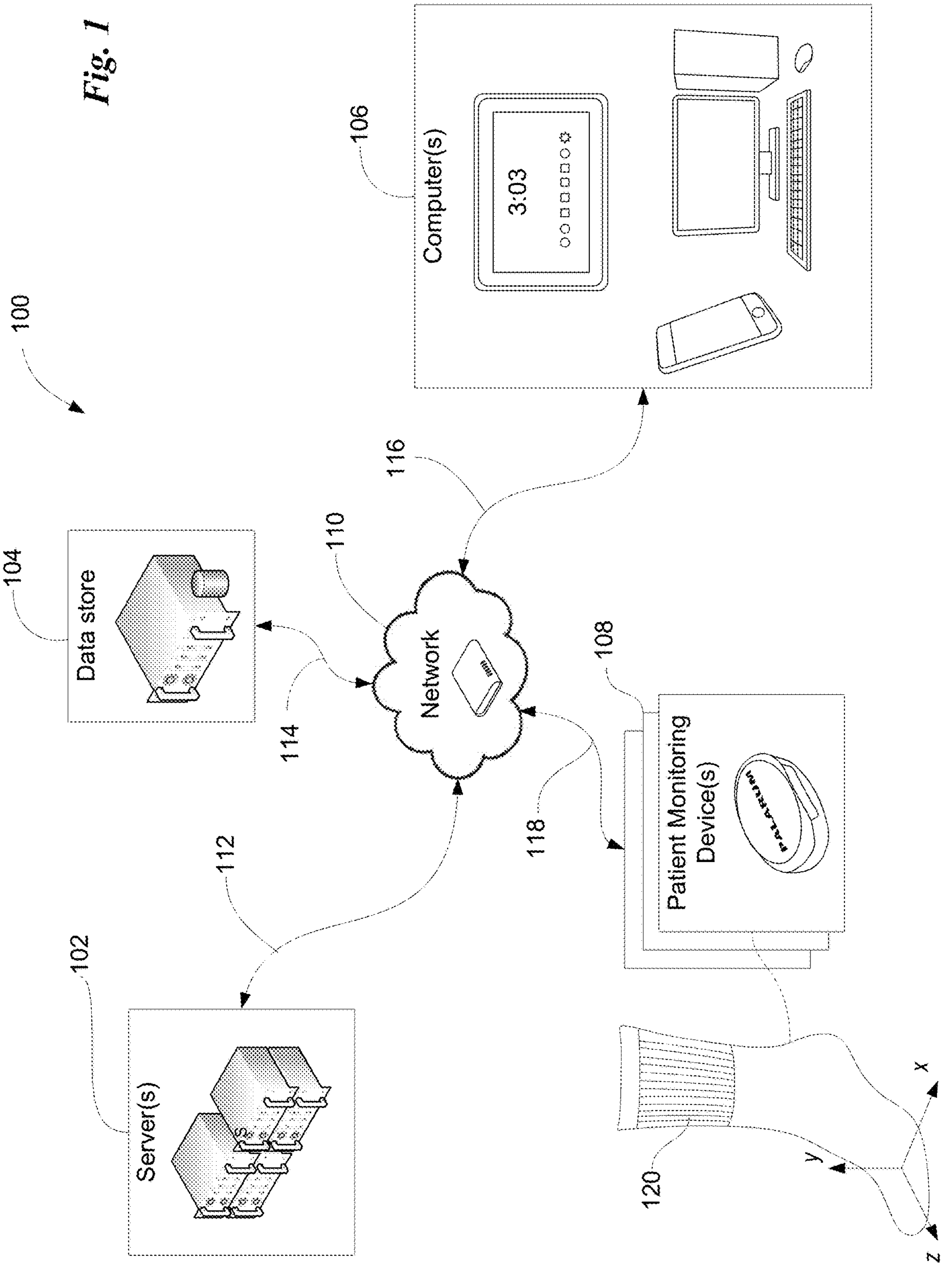
FIG. 1 is a component diagram illustrating exemplary components of a patient monitoring system as disclosed herein.

Illustrated in FIG. 1 is one example of components that may be included in a patient monitoring system 100. Patient monitoring system 100 may include a patient monitoring device 108 for detecting movements, combinations of movements, positional changes, and other patient related activities or events that may indicate a patient is about to fall. Monitoring device 108 may be coupled to a patient 120, for example, in a belt, an ankle bracelet, an armband, or as part of article of clothing such as a sock, shirt, gown, and the like. Patient monitoring device 108 may communicate with a server 102, a data store 104, a computer 106, and any other devices in the system using a communications link 118 and a network 110. In one example, a computer 106 may be configured to discover what patient monitoring devices 108 are nearby using network 110, and may be configured to allow a caregiver using a computer 106 to select from which patient monitoring devices to monitor and receive alarm information.

Server 102 may communicate with other devices 104, 106, and 108 via network 110 and communication link 112. Server 102 may be configured to perform various tasks such coordinating the analysis and storage of alarm related information and/or storing and analyzing event or sensor data from devices 108. Server 102 may be configured accordingly to accept event or alert information from a monitoring device 108, and determine what caregiver(s) should receive alerts for a given patient. Server 102 may make this determination based on criteria such as the caregiver's proximity to the patient, the patient's condition, the caregiver's specialties, and the like. In this example, alerts sent from a patient monitoring device are sent to server 102 and distributed to the appropriate caregiver when a patient monitoring device 108 indicates patient activity that may be outside the parameters set for that particular patient.

Data store 104 may be configured to store and provide access to information obtained as a result of monitoring patient activity. Data store 104 may include alarm information, patient activity data as captured by various sensors in patient monitoring devices 108, contact information and/or access credentials for caregivers, and/or a database of default patient profiles or profile parameter information to name a few non-limiting examples.

As disclosed in further detail below, the patient monitoring device 108 is configured to detect patient activity using various sensors, and to analyze that activity in real time to determine if it indicates a patient is likely to stand or fall. If a potential stand or fall event is detected, the monitoring device can send an alert notifying the server 102. The server can broadcast the alert to all or a subset of nearby caregivers giving them the opportunity to provide assistance before the patient falls.

Responding caregivers can also indicate whether the alert was warranted by communicating the patient's current situation back to the server using a computer 106 such as a tablet, smart watch, or smart phone. The server can use data store 104 to store this feedback from the caregiver, along with data values collected in real time by the monitoring device in the moments leading up to the alert. This data can then be analyzed by server 102 to determine what adjustments to the logic or configuration of the monitoring device should be made, if any, to increase the system's accuracy in predicting patient falls. The system's overall accuracy is thus improved by facilitating feedback from caregivers about whether the predicted fall was actually about to happen, actually did happen, or that a patient fell before any alert was raised.

Figure 2:
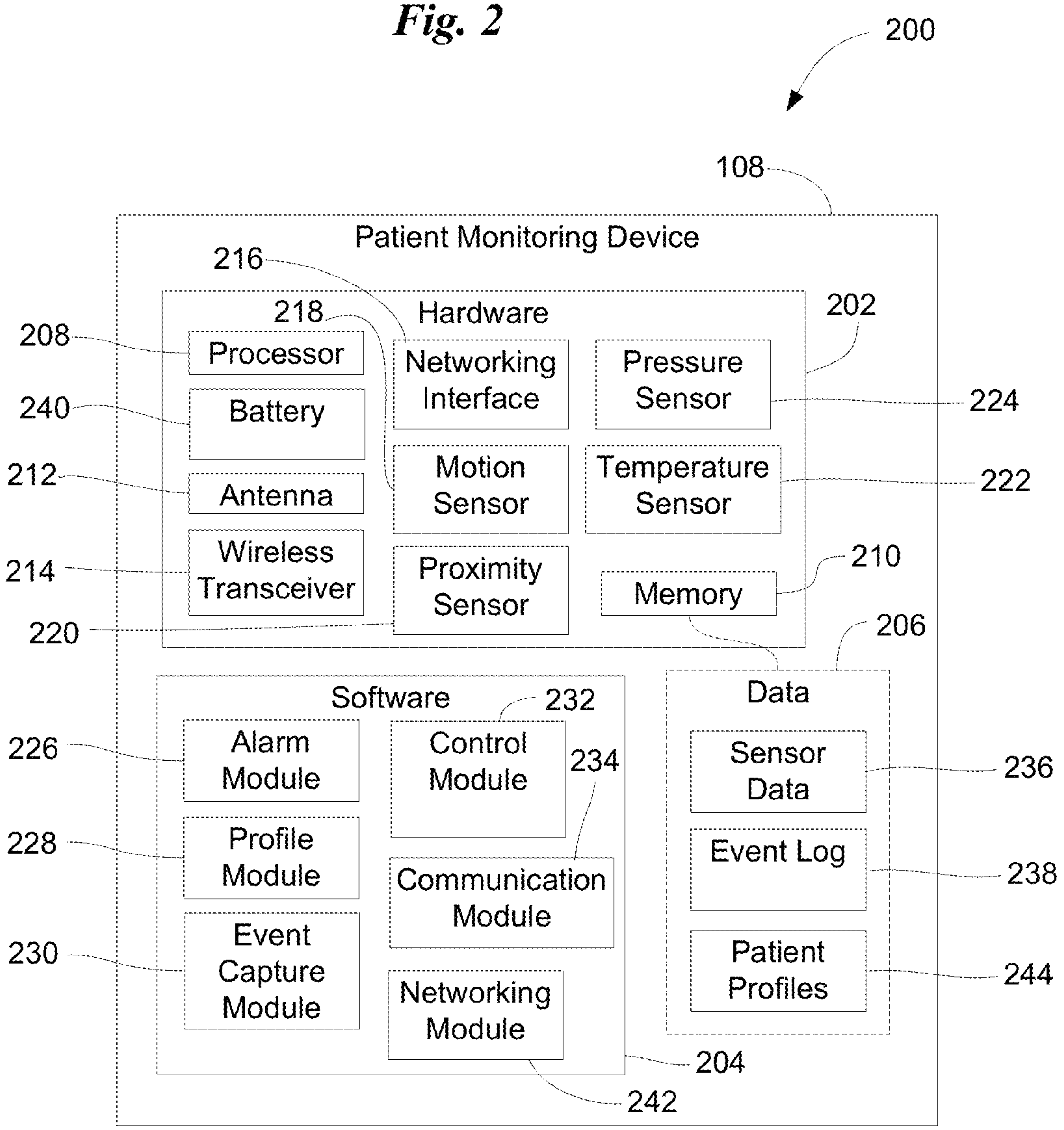
FIG. 2 is a component diagram illustrating aspects of a patient monitoring device like the patient monitoring device in FIG. 1

Additional detail of the software, hardware, and data aspects of a system like the one illustrated in FIG. 1 is further illustrated in FIGS. 2-6. FIG. 2 illustrates at 200 one example of an arrangement of components for a patient monitoring device like monitoring device 108. Monitoring device 108 may generally include hardware 202, software 204, and may also include a local data store 206. Any suitable arrangement of hardware or software modules may be used.

Hardware 202 may include a processor 208 which may be programmed to perform various tasks discussed herein related to monitoring patient activity. Processor 208 may be coupled to other aspects of hardware 202 such as sensors, memory, and the like to perform these tasks. Memory 202 may be included for storing operating values or parameters which may include intermediate or final values of calculations, logical or computational instructions for processor 208, or hardware control parameters. Memory 202 may also store patient monitoring information such as patient related events in an event log 238, sensor data 236 obtained from sensors coupled to the patient monitoring device, and/or patient profiles 244 for controlling how data about patient activity is collected and analyzed. Memory 202 may be either a permanent or "static" memory, or a temporary or "dynamic" memory, or any combination thereof.

An antenna 212 may be included to facilitate wireless communications over a communication link like communication link 118. A networking interface 216 may be included to process communications with other devices in the system communicated using a network such as network 110. Wireless transceiver 214 may be included and may use antenna 212 or other suitable hardware 202 to transmit and receive information between patient monitoring device 108 and other devices in the patient monitoring system such as server 102, data store 104, and/or computer 106.

Patient monitoring device 108 may include one or more sensors such as a motion sensor 218 configured to detect a patient's movements. Motion sensor 218 may be any suitable device or devices responsive to the movement of the patient and may include, for example, one or more accelerometers to detect movement in multiple axes relative to gravity, and/or one or more gyroscopic sensors for detecting changes in angular momentum and/or an angle of elevation. Motion sensor 218 may be used to detect when a patient changes position to get out of bed, or abruptly falls to the floor from a standing position, or from a supporting structure such as a bed, chair, wheelchair, and the like.

Hardware 202 may also include proximity sensor 220 configured to generate signals based on distance from a target object or location. For example, a sensor target object such as a magnet, a radio transmitter, or other target may be positioned in or adjacent to a chair or bed, or other reference point. Proximity sensor 220 may determine the distance between sensor 220 and the sensor target and provide this information as a time varying signal to other software or hardware components of patient monitoring device 108. For example, this proximity data may be processed by processor 208 according to software 204 and used to determine when a patient has traveled beyond a predetermined threshold distance from the sensor target as defined in the patient's profile.

A pressure sensor 224 may also be included, and may be useful for detecting changes in the distribution of pressure on a patient's body. For example, pressure sensor 224 may detect an increase in pressure in one body part, and a decrease in pressure in another as a patient moves from laying down to being seated upright. Pressure sensor 224 may also detect rapid drop in pressure on a particular body part when a patient is falling, and a subsequent rapid increase in pressure when the patient lands abruptly on a support surface such as the floor or the ground.

The temperature sensor 222 may also be included to provide further information about patient's location, position, and/or overall health. For example temperature sensor may be useful for determining when a patient removes the sensor from their body, when a patient moves outside a facility, or enters an environment that causes a large change in the patient's temperature, or in the temperature of the environment.

Any of the sensors used by patient monitoring device 108 such as sensors 218, 220, 224, 222, and others, may be mounted inside or outside a housing containing some or all of the other hardware and software components. For example, patient monitoring sensors may be mounted outside a container or housing and may communicate with hardware and software inside the housing by any suitable communications link. For example, pressure sensor 224 may be woven into a patient's clothing such as into a sock or gown, and may communicate with components of software 206 and hardware 202 mounted inside the housing via a wired or wireless communications link. This communications link may be maintained as electromagnetic signals traveling over wire leads, or through the air as radio waves using any suitable wireless communication technology.

These hardware aspects of patient monitoring device 108 may be configured to operate according to instructions included in software 204. These instructions may be logically or conceptually arranged as modules for controlling different functional aspects of the patient monitoring device. Functional aspects generally include obtaining, storing, and processing data from multiple sensors, detecting patient activity, determining when to send alert notices to other parts of the system, retrieving or updating patient profile information, and/or sending sensor data to a central archive to improve the performance of patient monitoring devices throughout the system.

Software 204 may include an alarm module 226 configured to send alarm related messages, events, or data to other parts of patient monitoring system 100. Alarm module 226 may determine when to send alert information notifying caregivers when a change in a patient's situation warrants immediate investigation. Alarm module 226 may include rules for determining under what circumstances an alert should be sent. In one example, alarm module 226 uses a patient profile 244 that has one or more patient related parameters with corresponding predetermined threshold values. These values may be used to determine when patient activity warrants further investigation.

Examples of alarm rules include a pressure rule that is triggered when signals are received from alarm module 226 that indicate changes in position or other activity that may have caused pressure differentials in the patient's feet or other monitored locations that are outside the predetermined threshold values in a patient profile 244. Such pressure sensor rules, when triggered, configure patient monitoring device 108 to send an alert indicating that changes in the pressure distribution of a patient's weight relative to a support surface no longer match the predetermined patient profile. In one example, the patient has been prescribed bed rest resulting in a predetermined target distribution of weight across the patient's back and legs stored in patient profile. This weight distribution may be periodically or continuously detected by pressure sensor 224 as signals sent from the pressure sensor to other parts of patient monitoring device for processing and storage. When a patient moves, such as to an upright seated position, pressure sensor 224 may begin sending different signals indicating a different distribution of weight that no longer matches the patient's profile. A rule in alarm module 226 may then be triggered to send data, message, an event, or any other suitable series of instructions or data to other parts of the patient monitoring system indicating that the patient has changed position.

In another example, alarm module 226 may include motion rules that may be triggered when motion sensor 218 indicates movement that falls outside the predetermined threshold values in patient profile 244 that are related to motion. Such motion related parameters in the patient profile 244 may include any combination of movement in general areas such as the patient's extremities, torso, or in specific areas such as movement of the head and neck, movement of an arm and/or leg, and the like. Such movement may include changes in the speed, acceleration, or angle of incidence relative to gravity for a give part of the patient's body. Patient profile 244 may be stored in memory 210 along with other relevant data and may be used to maintain these parameters which may be generic to many patients, or specific to the particular patient wearing monitoring device 108.

In another example, the alarm module 226 may include proximity rules that are triggered when a patient travels beyond a predetermined distance from a target location such as a bed, chair, or other supporting surface. For example, proximity sensor 220 may send signals continuously or at regular intervals to patient monitoring device 108 indicating the range to the target object. When the patient moves, proximity sensor 220 may send different signals indicating a change in distance to the sensor target. The rule in alarm module 226 may be triggered to send information to other parts of the patient monitoring system in the event that proximity sensor 220 indicates a range from the sensor target that exceeds a predetermined threshold in the patient's profile 244.

In yet another example, alarm module 226 may include motion sensor rules that when triggered, configures patient monitoring device 108 to send alerts when the patient's movements do not match the patient's profile. Using motion sensor 218, patient's movements may be periodically or continuously processed by patient monitoring device 108 as signals from the motion sensor change over time. At some point, patient's movements may change causing motion sensor 218 to send signals indicating a movement or series of movements that no longer match the patient's profile. A motion sensor rule in alarm module 226 may then be triggered to send event data to other parts of the patient monitoring system indicating that the patient's movements suggest activity that is outside the patient's predetermined thresholds in the patient's profile and thus may be or detrimental to the patient.

Alarm module 226 may be programmed with any suitable series of rules comparing the current state of patient monitoring device 108 to one or more predetermined threshold values. For example, alarm module 226 may include rules that are triggered based on combinations of input from multiple sensors received over time. These combinations may be defined in a monitoring rule, or in patient profile 244. In this way, one or more combinations of signals from one or more sensors may be considered over specific time intervals allowing for more complex considerations of data received from motion sensor 218, pressure sensor 224, temperature sensor 222, proximity sensor 220, and any other sensors that may be employed.

In another example, alarm module 226 may be configured with one or more status related rules. Such rules may include a wireless networking rule configured to trigger when wireless transceiver 214 reports signal strength from nearby wireless devices has fallen below a predetermined threshold. Another status rule may include a battery monitoring rule configured to trigger when the state of charge for a battery 240 is below a predetermined threshold. Others such status rules may include an error reporting rule configured to trigger when a hardware or software error condition occurs, when available storage capacity in memory 210 is below a predetermined threshold, and the like.

Alarm module 226 may also be programmed to include an alert level, severity level, level of importance, or other similar flag or indicator to assist the patient monitoring system in prioritizing, categorizing, or managing the response to alarms or alerts that may be raised. Alarm module 226 may include rules for calculating this priority level. For example, an alarm rule may be configured to set the severity level of an alarm to indicate a high degree of importance in the case where a particular threshold value (e.g. patient's movements) exceeds parameters set in the patient's profile by greater than a predetermined severity level threshold. Priority levels may be indicated in any suitable fashion such as a range of numbers zero through nine or zero through a hundred and the like, or a "high", "medium", and "low" indicator.

For example, if a patient's movements exceed parameters in the patient profile by less than 10%, alarm module 226 may generate an alarm with the severity level that is at a lower level such as zero or one or "low". When the patient's movements exceed the upper range of a patient's profile by for example 10-30%, a higher level may be assigned such as a three, or four or a "medium" indicator may be used. For situations where patient movement exceeds the patient's profile parameters by greater than 30%, a "high" indication may be assigned to the alert information, or a value such as eight or nine. This is but one non-limiting example as any suitable scheme for prioritizing alarm information may be used.

Profile module 228 may be configured to accept or modify or otherwise maintain a patient profile 244. Patient profile 244 may include multiple parameters detailing information about the patient, the patient's treatment plan, and other information useful to patient monitoring device 108 and the rest of patient monitoring system 100. A patient profile may include any information about the patient useful for predicting and preventing patient falls. Such information may include detailed patient measurements such as medical condition, height, weight, body composition, treatment plans, drug regimens, and the like. It may also include demographic information such as sex, race, and the like.

For example, a patient profile may include parameters indicating whether a patient should be allowed to move away from a supporting surface such as a bed or chair, whether the patient should be allowed to assume a particular posture or position such as standing, walking, sitting, laying down (left and/or right side), and the like. A patient's profile may indicate under what circumstances a patient may leave the room, or how often the patient should be repositioned in place.

Parameters, or parameter ranges may be specified in any suitable format such as numbers, letters, binary data, and the like. For example parameters may be organized to correspond with input values required by one or more rules in alarm module 226. In another example, patient parameters may be configured to correspond with output ranges of specific sensors or combination of sensors used by patient monitoring device 108. The patient parameters may be thought of as predetermined threshold values that may be compared to sensor or other data according to a rule. These predetermined threshold values may be specific values or ranges of values, with or without accompanying tolerances. Such values may be numerical, textual, or any combination thereof.

An event capture module 230 may be configured to collect available event related information to send out to other parts of patient monitoring system when an event occurs. This information may include a snapshot of the patient's present condition and state as determined by the sensors in patient monitoring device 108. A current reading from the motion sensor 218, proximity sensor 220, pressure sensor 224, temperature sensor 222, and/or the state of various subsystems in patient monitoring device 108 such as battery 240, memory 210, or any combination thereof. Event data may also include the rule triggered, date and time stamp, and the like.

Event capture module 230 may collect event information when alarm is triggered, or periodically to provide patient monitoring system 100 with an ongoing regular status update of the patient's condition, position, activity, and the like. Event capture module may include rules specific to general event capture irrespective of whether an alarm state has occurred. For example, an event capture rule may store event information in an event log 238 in memory 210 when patient activity occurs but is not outside the parameters specified for such activity in patient profile 244. This may be advantageous in providing "baseline" values for the state of a patient leading up to an alarm condition when it occurs. Event data may be stored in event log 238 and transferred to data store 104.

Other contextual information may be collected as well and sent along with an alert or event update. Such contextual information may include signals or other data received from sensors or other parts of patient monitoring device 108 for a predetermined time period prior to the alert being sent. For example the alarm module may collect all data obtained or received by patient monitoring device 108 for the last 60 seconds before the alert was sent, for the last five minutes before the alert was sent, for the last half an hour, or for some period of time greater than a half an hour. In another example, the transmission of data may be based on a number of events rather than a specific period of time. This data may include all available monitoring data, or some portion of the data as determined by the triggered rule, or by alarm module itself to 226.

In one example, when a motion sensor rule is triggered, the rule may be configured to collect the preceding two minutes of motion sensor data and/or the preceding five minutes of pressure sensor data to be sent with the alarm message. In another example, alarm module 226 may be configured to collect the preceding five minutes of data from some sensors (e.g. pressure sensor, proximity sensor, and or motion sensor) but not others (e.g. temperature sensor). In another example, stored data from all sensors may be collected by 226 after a predetermined number of events have been detected and stored from a number of different sensors. This kind of "pre-alarm" data may be used by other parts of patient monitoring system to detect patterns of sensor data that indicate certain patient activity is imminent or to determine probabilities of false positives and false negatives. This information can be used to refine when rules should trigger.

Assembled data may be organized into an alarm message which may include the current snapshot of the patient's condition and any other information related to the alarm that may be useful to other parts of the patient monitoring system. The message may be transmitted over a communication link using networking interface 216 to be processed by a server such as server 102, or seen by an operator at a computer such as computer 106. The data may be stored in data store 104 along with associated sensor data.

Control module 232 may be included to organize the operations of software 204 and/or hardware 202. Control module 232 may be configured to initialize the activity of patient monitoring device 108 such as going through a basic startup and testing procedure, running through algorithms or subroutines to locate and communicate with server 102, data store 104, computer 106, and or other devices in the patient monitoring system. Control module may then begin one or more control loops periodically or continuously obtaining sensor data from one or more sensors in the patient monitoring device such as pressure sensor 224, motion sensor 218, proximity sensor 220, and or temperature sensor 222 or others. Control module 232 may be thought of as a "controller" that controls the operation of patient monitoring device 108.

A communication module 234 may be included as well. Communication module 234 may be configured to open and maintain communication links to various other parts of the patient monitoring system such as server 102, data store 104, and others. Communication module 234 may be configured to implement any suitable digital, analog, or other communication scheme using any suitable networking, or control protocol. Communication module 234 may engage or use networking module 242 to open, maintain and manage communication links with other aspects of the patient monitoring system via network.

In one example, communications module 234 may be configured to automatically establish communication link 118 with network 110. Patient monitoring device 108 may be configured to operate according to the IEEE 802.15 wireless networking standard (sometimes referred to as a "Bluetooth" or Wireless Personal Area Network or "WPAN"). In this example, communications module 234 may automatically interact with routers, switches, network repeaters or network endpoints, and the like to establish a communications link 118, and/or 112 so that event updates may be automatically configured to pass to server 102 where they may be processed and distributed. Communications module 234 may be implemented to use any combination of Generic Access Profile (GAP), Generic Attribute Profile (GATT), and/or Internet Protocol Support Profile (IPSP) protocols to acquire and maintain communications with server 102, data store 104, and/or computers 106.

Monitoring device 108 may maintain data 206 which may include sensor data 236, event log 238, and one or more patient profiles 244. Data 206 may include diagnostic information, timestamps and other contextual information related to actions taken by patient monitoring device 108, alarm messages sent, raw sensor data, and the like. Data 206 may be accessed by other software or hardware in patient monitoring system 108. Data 206 may be periodically refreshed or deleted to optimize use of memory 210.

Stored patient profiles 244 may include default parameter values general to many patients, or parameter values specific to one patient. These parameter values may be refreshed periodically from time to time such as by a firmware upgrade, by replacing a memory card, or via communications link 118. Profile parameters may be analyzed and processed on another computer such as server 102 and periodically sent to patient monitoring device 108.

Figure 3:
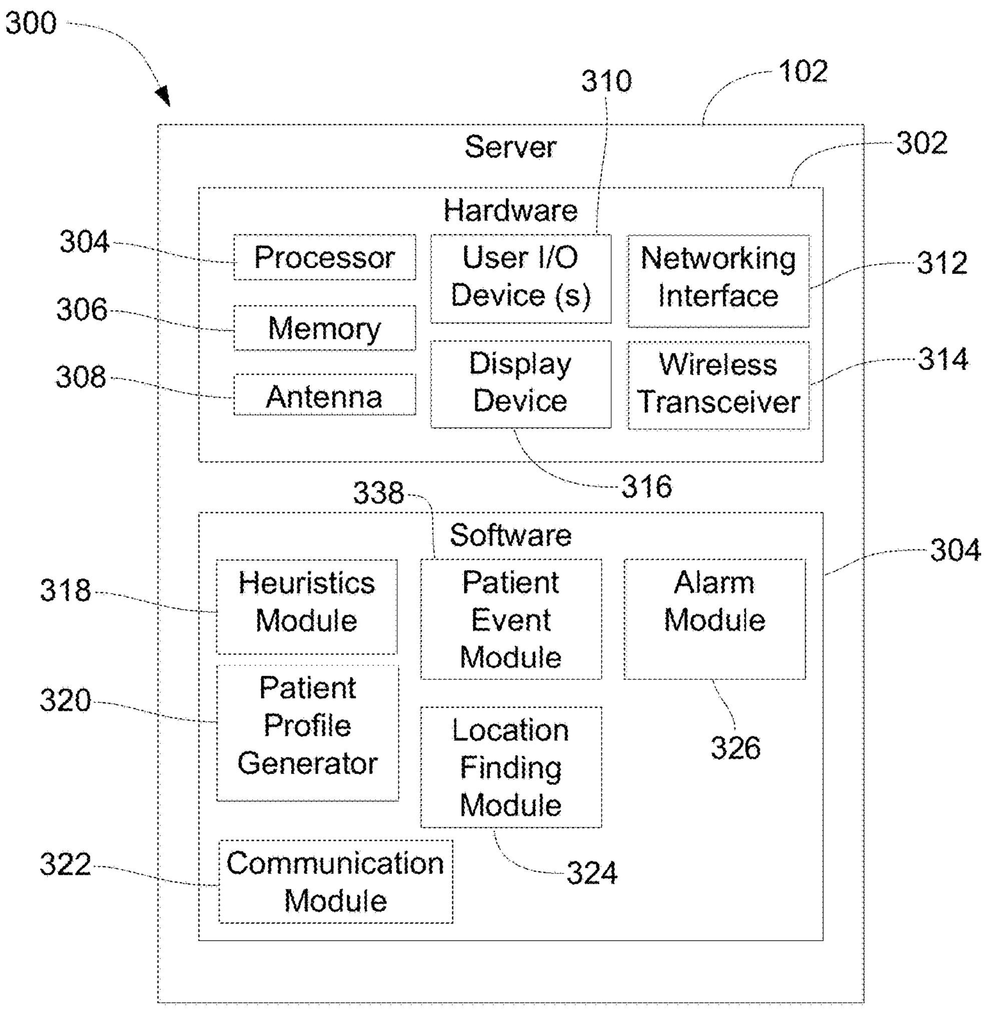
FIG. 3 is a component diagram illustrating aspects of a server like the server in FIG. 1.

One example of software and hardware components that may be used to implement a server such as server 102 is shown in FIG. 3 at 300. Server 102 may include any suitable combination or arrangement of hardware and software. For example, server 102 may include a processor 304 that can be configured or programmed to perform calculations related to generating and maintaining patient profiles, maintaining current locations for patients being monitored, receiving and propagating alarm or event information, and/or analyzing historical results from previous alarm situations. Other components in the system such as computers 106, patient monitoring devices 108, and data store 104 may communicate with server 102 to collect and or receive this information as events unfold for the patients being monitored.

Communication between server 102 and other parts of the system using communications links may be facilitated by transceiver 314. For example, communications links 112, 114, 116, and 118 may be implemented via any suitable wireless technology such as WiFi, Bluetooth, and others using transceiver 314 and antenna 308.

Server 102 may include user I/O devices 310 which may include any suitable devices for accepting input from a user such as keyboards, mice, or other I/O devices. For example, devices 310 may include a touchscreen, one or more buttons or other controls on a control panel coupled to or integrated with server 102.

Server 102 may include a networking interface 312 for communicating with other parts of the patient monitoring system such as the data store 104, computers 106, and the like. Interface 312 may interact directly with network 110 through a wired or wireless communications link. For example, a communications links like communications link 112, 114, 116, and 118 may connect server 102 to a computer 106. A memory 306 may be included as well for temporarily or permanently storing sensor data, profile data, logical or computational instructions, and the like.

A display device may be included as well for displaying a user interface such as a Graphical User Interface (GUI) generated by server 102. The GUI may include graphical controls for managing or maintaining aspects of server 102 and/or other components of the patient monitoring system. For example, the GUI may be configured with controls for calculating or generating new patient profiles, manually overriding alert messages sent from a patient monitoring device 108 (e.g. marking a result as a "false positive" or "false negative"), upgrading software in server 102, in patient monitoring devices 108, and/or in computers 106. Display device 316 may be a touchscreen programmed to perform these or other tasks using any suitable configuration of text, graphics, and/or GUI controls such as check boxes, drop-down lists, text fields, buttons, and the like useful for accepting input and displaying output.

Software components of server 102 may include a patient event module 338 which may configure processor 304 and other components of server 102 to process information about activities or events taking place with monitored patients. Event or alarm messages may be generated by patient monitoring device 108 and may include about a patient's disposition as detected by a patient monitoring device 108.

For example, as discussed herein elsewhere, patient monitoring device may detect the patient has changed position from a laying down to sitting up, rolling from the left side to a right side or vice versa, has begun to walk around a room, or has fallen from a support surface such as a chair or bed. Event module 338 may be configured to receive these events or alarms, and determine how they should be processed and/or stored by server 102. For example patient event module may configure server 102 to communicate event data to data store 104 for long-term storage or future processing. Patient event module 338 may also configure server 102 to communicate with other computers such as computers 106 operated by caregivers and others.

Event capture module 230 in a patient monitoring device 108 may communicate event or alarm messages to patient event module 338 as they occur. For example, patient monitoring device 108 may collect information with one or more sensors such as a motion sensor 218 and the like, and may determine by rules in alarm module 226 that the event does not fall outside profile parameters in the patient profile. Thus no alarm may be generated. However, event capture module 230 in the patient monitoring device 108 may deliver the event information to server 102 where it may be received by and processed by patient event module 338. Patient event module 338 may store, process, or otherwise perform logic functions on the event as well. In this way, patient monitoring device 108 may maintain periodic or nearly constant communication with server 102 collecting information about patient activities which may be processed in the future to detect false positives, false negatives, or otherwise refine the event collection and alarm process to better ensure patient safety and adherence to treatment plans.

When alarm module 226 in the patient monitoring device determines that patient activity is outside the predetermined thresholds in the current patient profile 244, an alarm or alert may be generated by patient monitoring device 108 which may be communicated to server 102 and handled by alarm module 326. Alarm module 326 may process the alarm information received from patient monitoring device 108 according to one or more processing rules for handling the alarm.

For example, rules in alarm module 326 may be configured to process and route alarm information through communications link 116 to one or more computers 106. These rules may use any information in an alarm or event to determine which computers associated with particular caregivers are to receive information. For example, the information may be routed based on severity level included in the alarm with "high" priority alarms sent to multiple individuals so that these individuals can converge on the patient to provide faster assistance. In another example, an alarm may be sent a single individual regardless of severity. The information in the alarm may be presented to the user of computer 106 by any suitable means such as a GUI on a display device that may include text, graphics, symbols, or flashing regions of the screen etc. Sounds, flashing lights, vibration, automatically generated and automatically generated phone calls are other notification methods that may be used. Any suitable notification means may be employed.

Alarm module 326 may include one or more notification rules useful for determining what contacts to notify with specific alarm information and under what circumstances to do so. Alarm module 326 may also access a database of contact information in data store 104 when a rule is triggered indicating a specific contact who is to receive specific alarm information for a given alert. Alarm module 326 may communicate the information using any suitable method such as by e-mail, by automated telephone call, by a Short Message Service (SMS) "text" message, by a push notification to an app on a personal computing device such as a cell phone, smart watch, or tablet and the like.

In another aspect, alarm module 326 may be configured to maintain information about alarm rules used by alarm module 226 in patient monitoring device 108. Alarm module 326 may be configured to accept input from computer 106, or elsewhere, adjusting how and when the rules trigger alarms based on the various parameters in a patient profile 244. These rule upgrades may then be sent to a specific patient monitoring device 108, or to all such patient monitoring devices thus allowing the behavior of the monitoring devices to be upgraded and improved.

A communication module 322 may be included in server 102. Communication module 322 may operate like communication module 234 in patient monitoring device 108. Module 322 may be configured to open and maintain communication links to various other parts of the patient monitoring system such as server data store 104, patient monitoring device 108 and others. Communication module 322 may be configured to implement any suitable digital, analog, or other communication scheme using any suitable networking, control, or communication protocol. Communication module 322 may engage or use networking module 312 to manage communication with other aspects of the patient monitoring system via network 110 and any communications links that may be involved.

Location finding module 324 may be included and may configure server 102 to collect, analyze, process, and/or maintain information in real time indicating the location of patients, caregivers, or other people and objects. Such location information may be used by the system in order to route alert information to the proper caregivers. For example, alarm module 326 may collaborate with location finding module 324 and use patient and caregiver contact information from data store 104 to determine the closest qualified caregiver to notify when an alarm is issued. Location finding module may use any suitable technology whether internal or external to the patient monitoring system for tracking the location of people and objects such as Global Positioning System (GPS) and/or Real-Time Location System (RTLS), and the like.

Software 304 may include heuristics module 318 which may configure server 102 to make adjustments to patient profiles based on input from caregivers, past events or alarms, ongoing monitoring of events as they occur, and the like. Adjustments to patient profiles may be made based on past information to better anticipate or predict situations where an alarm should be issued more often, lest often, or not at all. Server 102 may process this information substantially continuously during normal operation as new data is collected from patient monitoring devices, and as alerts are raised and feedback from caregivers is received.

In one example, heuristics module 318 may send variable profile updates for one or more patient profiles if multiple false positives, or false negatives are encountered during treatment. For example, patient monitoring device 108 may sense motion or pressure relative to a support surface that falls outside parameters in the patient's profile causing an alarm message to be sent. After observing the patient, a caregiver may determine that the alert was a false indication of a potential patient fall when the likelihood of a fall was actually very low (i.e. below a predetermined threshold). Heuristics module 318 may receive this information from a computer 106 which may include data collected at the time of the event. Heuristics module 318 may then analyze the data and adjust parameters in the patient's profile accordingly to reduce or eliminate the number of similar future false alarms for that particular patient, and possibly for all other similarly situated patients. These adjustments to other patient monitoring devices may occur in real time as soon as the data can be analyzed after the alert has been handled by caregivers.

In another example, the heuristics module 318 may be used to calculate thresholds for one or more standard or default profiles based on patient and demographic data and "pre-alarm" or other information available for an alarm event. The heuristic module may, over time, collect a large body of sensor data, event data, alarm information, demographic information, and the like which may be used to refine thresholds in patient profiles or in default profiles, to better align the parameters that may generate an alert with the patient, the patient's history, and the patient's treatment plan.

In another example, the heuristics module may be used to determine that changes to the functional aspects of alarm rules used by alarm module 226 in patient monitoring device 108 may be beneficial to avoid excessive false alarms. Heuristics module 318 may determine from analyzing alarm data over time that certain alarm rules are causing excessive false readings and should be reviewed and/or removed from alarm module 226.

A patient profile generator module 320 may be included for creating patient profiles that may be used by other devices in the system such as patient monitoring device 108. Profile generation module 320 may create the profile, and deliver it to a patient monitoring device 108 via communications links 112 and 118, and network 110.

Profile generator 320 may be used when the system begins monitoring a patient, or at any other suitable time such as when a new profile is needed for any reason. An "initial" or "default" profile may be selected initially to provide a template or baseline profile that profile generator module 320 may use in tailoring the profile to the patient. The system may include multiple "default" profiles specific to any number of parameters or aspects. For example, the system may have separate default profiles for men, for women, or multiple profiles for men and women specific to various age ranges, races, medical histories, drug therapies, and the like. Any patient data may be considered in selecting and generating a profile such as data about any medical conditions a patient may have that may be detected by the patient monitoring device.

For example, a person with a neuromuscular disorder, or other disorder, that causes regular periodic movement of an arm, leg, or neck may benefit from an initial profile with parameter threshold values that take this kind of movement into consideration. These threshold values may thus configure patient monitoring device 108 to adjust its threshold values to account for movement specific to the patient's particular condition so that extraneous movements common to people with the patient's condition are ignored Profile generation module 320 may also configure server 102 to accept input selecting an appropriate "default" profile, and additional input from a caregiver using server 102 or another computer such as computer 106 to tailor the profile to a particular patient's specific needs. Customizing the profile may include importing or entering aspects of a patient's treatment plan, or entering details specific to the patient's condition that are not provided in the default profile, or differ from the threshold settings provided by the default profile.

Figure 4:
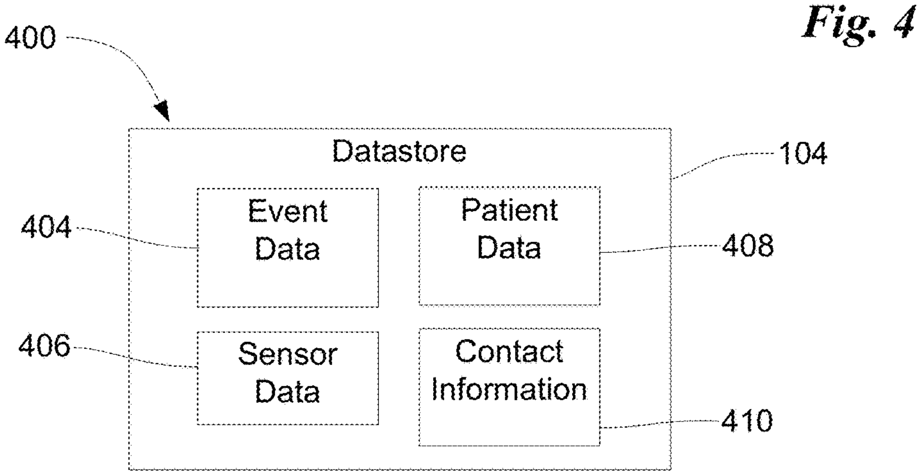
FIG. 4 is a component diagram illustrating aspects of a data store like the data store in FIG. 1

FIG. 4 illustrates at 400 one example of a data store or knowledge base 104 that may be part of the patient monitoring system to store information. Though the patient's identity need not be revealed, data store 104 may include patient data 408 having patient records with detailed information about the patient's medical history, treatment plan, demographics, and the like. Sensor data 406 may be included for storing various pressure, motion, proximity, and other data collected or processed by patient monitoring devices 108. Data store 104 may include event data 404 with detailed information captured by patient monitoring device 108, server 102, and computers 106 when an event occurs. Event data may include or refer to other information such as sensor data 406, patient data 408, as well as information about the decision making process leading up to the event being created and sent. For example, event data 404 may include the sequence and selection of rules that were triggered causing the event to be sent. It may include other data such as a patient's vital signs before, during and after the event, which caregivers responded, how long it took them, how far they had to come to lend aid, and the like.

Data store 104 may also include contact information that can be used by the patient monitoring system to contact information for various individuals or other devices/systems that can have notification information sent to them. Contact information in the contact database 354 may include names, addresses, email addresses, telephone numbers, Internet Protocol (IP) addresses, web service URLs, or any other suitable information useful for contacting an entity interested in receiving event notification information. Server 106 may receive and process events from multiple monitoring devices 108. Once processed, the notification information may be sent to contacts specified in contact database 410. These contacts may receive the notification information for one or more events using a personal or mobile computer 106.

Figure 5:
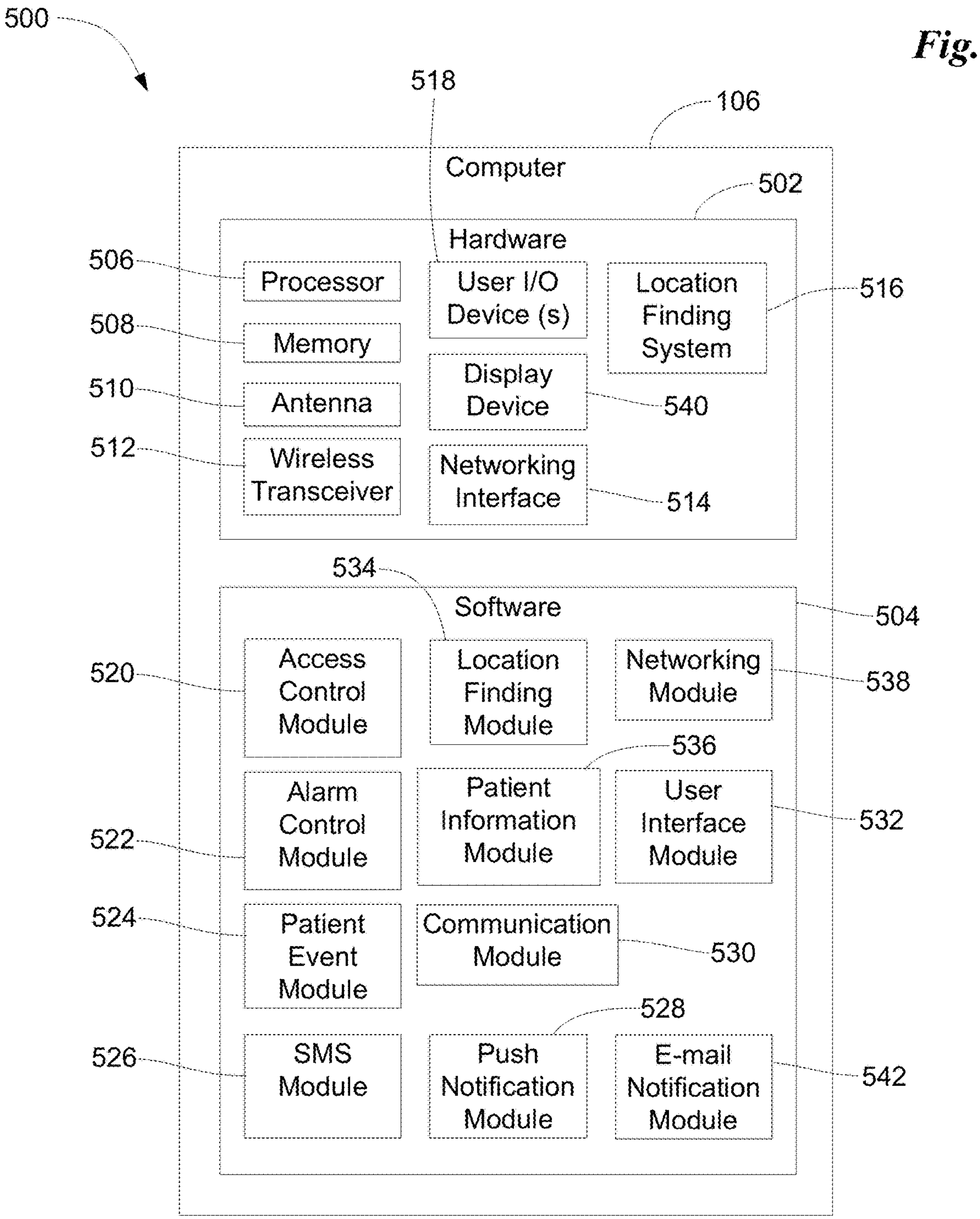
FIG. 5 is a component diagram illustrating aspects of a computer like the computer in FIG. 1

A computer or other electronic alert device like computer 106 may be used by caregivers to receive alert information from server 102 or personal monitoring devices 108. Such a computer, or similar alert device, may also be used in proximity to a patient, such as in the patient's room, or worn as an arm band to notify the patient that their movements may lead to a fall. One example of the software and hardware aspects that may be included in computer 106 is illustrated in FIG. 5 at 500. Hardware 502 included in computer 106 may be configured according to instructions included in software 504 controlling the computer to receive alarm information, make the information in the alarm available to a user such as a caregiver, and allow the caregiver to respond accordingly in a timely fashion.

Hardware 502 may include a processor 506 which may be programmed to perform various tasks discussed herein related to monitoring patient activity. Processor 506 may be coupled to any other aspects of hardware 502 such as memory 508, networking interface 514, and others. The functions performed by processor 506 may be configured according to instructions encoded in software 504, or in hardware 502.

Computer 106 may include user I/O devices 518 which may include hardware and/or related software for managing input and output with devices 518. These devices may include equipment such as keyboards, mice, touchscreens, intelligent voice recognition and the like. A network interface 514 may be configured to interact with networks like network 110 via communications links like links 112, 114, 116, and/or 118. A display device 540 may be included as well for displaying a user interface generated by computer 106. With many tablet, smart phone, smart watch, or desktop personal computing devices, display device 540 may be a touchscreen making it part of the user I/O equipment 518 as well.

A memory 508 may be included as well for temporarily or permanently storing data values or instructions and the like. Computer 106 may also include a wireless transceiver 512 which may include hardware and/or software implementing a wireless communication interface. Wireless transceiver 512 may be coupled to an antenna 510, and may include a transmitter, receiver, and/or other useful equipment configured to send and receive signals. In this respect, wireless transceiver 512 may be useful for maintaining a wireless communication link such as link 116 and may interact with network interface 514 as necessary to receive and send information. Wireless transceiver 514 may also be useful for sending and receiving cellular telephone calls such as telephone calls, text messages, and the like.

Hardware 502 may also include a location finding system 516 that may use any suitable technique for obtaining a physical location for computer 106. The location-finding system may use any combination of other hardware and software to accomplish the goal of maintaining accurate and precise positional information. Wireless transceiver 512 and antenna 510 may be used to triangulate the position of computer 106 based on communications with various transmitters and receivers in the area.

For example, location finding system 516 may determine the location of computer 106 based on communications with beacon transmitters and/or networked receivers positioned in known locations around the environment to be monitored. These transmitters and receivers may be included in networking equipment operating as part of a local wireless network that conforms to Institute of Electrical and Electronics Engineers (IEEE) 802.11 wireless networking standards (sometimes referred to as a "WiFi" or a Wireless Local Area Network or "WLAN"). In another example, these transmitters and/or receivers positioned in the environment may include devices that operate according to the IEEE 802.15 wireless networking standards (sometimes referred to as a "Bluetooth" or Wireless Personal Area Network or "WPAN"). Other technologies may be useful as well as the satellite based Global Positioning System (GPS) or triangulation based on interactions with cell tower transmitters and receivers that are part of a cellular network.

Software 504 may include various modules for configuring functional aspects of computer 106. A user interface module 532 may be provided for generating user interfaces with graphical buttons, windows, text boxes, selection boxes, and other widgets configured to gather data or elicit specific responses from the user which may be accessible using any suitable input device such as a touch screen, mouse, or keyboard. User interface module 532 may also display various glyphs, figures, icons, graphs, charts, tabular displays, and the like which may or may not be modified or interacted with using any suitable input device. User interface module 532 may be used in conjunction with other software modules to provide navigational control between various presentations of information, to accept character or selection input from an input device, and/or to generate graphical displays of relevant data accessed by other software modules. User interface module 532 may operate in conjunction with an operating system installed on computer 106 which may include libraries of windowing widgets, basic input/output capabilities, and basic file system and network interfaces for user interface module 532 and for other software modules as well.

User interface module 532 may use any suitable display technology, programing language, toolkit, Application Program Interface (API), or protocol to create the user interfaces for computer 106. Module 532 may, for example, interpret and display a dynamically or statically created web page sent from server 102 as Hypertext Markup Language (HTML) and may include a web browser for viewing the results. User interface module 532 may include an "app" or application operating as a client and connecting to server 102 over network 110 to retrieve data which is then displayed using graphical controls such as buttons, selection boxes, text fields, widgets, and the like.

In one example, user interface module 532 may include a graphical user interface displaying alert information. This information may include an indication of the severity of the alert, the patient's name and/or location, an indication of the type of alert (e.g. a fall, change in position, excessive movement, etc.), and/or any other relevant information made available by a patient monitoring device or any other part of the monitoring system. A map of the local area may be included as well with indicia showing the patient's location in relation to the location of computer 106. In another example, the alert information may be configured to exclude information identifying the patient. In yet another example, noise may be included in the data from the monitoring device to further obscure a specific patient's identity.

Multiple response options may be presented by user interface module 532. A responding individual may select buttons, checkboxes, enter text, or perform other actions based on the options provided. For example, computer 106 may be a tablet computer, smart watch, or smartphone which may be carried by a responder to the patient's location. Upon inspecting the patient and the circumstances surrounding the alarm, a responder may use the options presented by user interface module 532 to notify the patient monitoring system that a visual or other inspection of the patient, the patient's equipment or environment was performed. The user interface provided may configure computer 106 to accept input indicating the alert was warranted and was due to patient movement or other activity that was potentially detrimental.

The user interface may be configured to accept input indicating the alarm was not warranted and was due to, for example, an equipment malfunction or resulted from harmless or unintentional patient activity (e.g. mistakenly or incidentally bumping the sensor while asleep, or otherwise triggering the alarm through harmless action). This information may then be passed to server 102, data store 104, or to any other aspect of the patient monitoring system.

An access control module 520 may be included for identifying the user of computer 106 according to one or more credentials and for controlling access to hardware and software aspects of the system. Such access control may include a user interface generated by user interface module 532 which may include buttons, text fields, and other controls configured to accept credentials as input from a user. Such credentials may include a user name, password, answers to questions, and the like. Other examples may include credentials stored on a physical object in the possession of the user, such as a Radio Frequency Identification (RFID) tag, Near Field Communication (NFC) badge, card with magnetic strip, barcode, portable memory device (e.g. Universal Serial Bus (USB) memory "stick" or plastic card) containing a secret token or other encoded or encrypted information.

In another example, user credentials may include biometric input. Access control module 520 may control a biometric input device which may be one of user I/O devices 518. This device may be configured to measure or scan or accept data representing one or more physical characteristics of the user such as a fingerprint, handprint, iris, facial topography, word, phrase, or other vocalization, and the like.

A location finding module 534 may be included and may configure computer 106 to process information received by location finding system 516 to determine the location of computer 106. This location information may be used by the system in order to route alarm information to the proper caregivers. Location finding module may also send the location information to other parts of the system such as server 102. This information may be distributed continuously and/or at regular intervals and may be used to determine the location of the closest qualified caregiver when an alarm is raised.

An SMS module 526 may be included with software 504 for configuring computer 106 to receive text messages distributed by server 106, or by others. SMS module 526 may configure computer 106 to interact with other servers such as SMS service centers or short message gateways to receive the SMS messages specific to a particular personal computing devices 302. SMS module 526 may interact with other modules such as user interface module 532 to display SMS messages according to user preferences.

A push notification module 528 may be included with software for configuring computer 106 to receive push notification messages distributed by server 102, or by others. Push notification module 528 may configure computer 106 to interact with centralized push notification servers using network interface 514, communications link 116, or other suitable communications links. Push notification module 528 may interact with other modules such as user interface module 532 to display push notifications according to user preferences. Push notification module 528 may be configured to send and/or receive push notifications according to any suitable protocol. Examples include, but are not limited to, Advanced Message Queuing Protocol (AMQP), Message Queue Telemetry Transport (MQTT) protocol, and Simple/Streaming Text Oriented Messaging Protocol (STOMP).

An e-mail module 542 may be included with software for configuring computer 106 to receive email messages distributed by server 106, or by others. Email module 542 may configure computer 106 to interact with centralized electronic mail servers using network interface 514, communications link 116, or other suitable communications links. Email module 542 may interact with other modules such as user interface module 532 to display email messages as specified by the user.

Software 504 may include an alarm control module 522 which may be included to configure computer 106 to receive alarm related messages, events, or data from other devices in the patient monitoring system 100 such as server 102. Alarm control module 522 may use other hardware or software modules to display and otherwise alert the patient or a caregiver that an alarm has been raised. Alarm control module may be configured according to user preferences, or according to a predetermined notification policy, to display any combination of visual, audible, tactile, or other notification of an alarm. Such notification may include a push notification appearing on a display device 540, an e-mail sent to a caregiver's e-mail address, an SMS message viewable using SMS module 526 or other SMS client software in computer 106, an automatic telephone call, an alarm indicia appear on display device 540 using user interface module 532, and/or an audible sound or ringtone being played, or any suitable combination thereof.

Alarm control module 522 may display details about the patient involved in the alert by accessing patient information using patient information module 536, and/or by accessing patient data 408 in data store 104. Information about the patient, the alarm, and other related information may also be included in the alarm message sent from server 102. Alarm control module 522 may collaborate with user interface module 532 to display this information to the caregiver allowing them to view specifics about the event, or activities that lead up to the event. This user interface may be configured to accept input from a user that may include response options such as confirming the alarm is valid, declaring that it is invalid, making adjustments to the profile thresholds thus changing the behavior of patient monitoring device 108, and/or entering additional observations about the patient, the equipment, the treatment plan, and the like.

Networking module 538 may include software for configuring computer 106 to establish and maintain communication link 364. Networking module 538 may therefore configure processor 506, network interface 514, I/O devices 518, and any other suitable hardware or software in compute 106. Any suitable protocols may be supported by networking module 538 such as Transmission Control Protocol/Internet Protocol (TCP/IP), User Datagram Protocol (UDP), Ethernet protocol, or any other suitable networking protocol. Any of these protocols may be used to establish and maintain communications link 116 which may then be used to interact with server 106. Put another way, server 106 may use any of these protocols, or any other suitable networking protocol to distribute information to computers 106, or to other recipient systems.

A communication module 530 may be included in computer 106. Communication module 530 may operate like communication modules 234 and 322 in patient monitoring device 108 and server 102 respectively. Module 530 may be configured to open and maintain communication links to various other parts of the patient monitoring system such as server data store 104, patient monitoring device 108 and others. Communication module 322 may be configured to implement any suitable digital, analog, or other communication scheme using any suitable networking, or control protocol.

A patient event module 524 may be included in software 504 which may configure computer 106 to process information about activities or events taking place with monitored patients. These events may be sent by server 102 or patient monitoring device 108, and may or may not involve emergency or alarm situations. As discussed above, patient events may be generated by patient monitoring device 108 and distributed by server 102. These may include notifications about a patient's movements, changes in position, and the like. Event module 524 may be configured to receive these and other events, and make them available to a caregiver. A caregiver may view this information when an alarm is raised, or at other times to better ensure patient safety and adherence to prescribed treatment plans.

A patient information module 536 may be included with software for configuring computer 106 to obtain and display patient information. Patient information module 536 may configure computer 106 to interact with a centralized database of patient information such as data store 104 to obtain information for review, to edit information in the data store, to add new patient information, or to delete information that is incorrect or extraneous. Patient information module may interact with other modules such as user interface module 532 to display patient information messages upon request by a user, or with alarm control module 522 to obtain and display patient information or links which display patient information if selected by the user.

Figure 6:
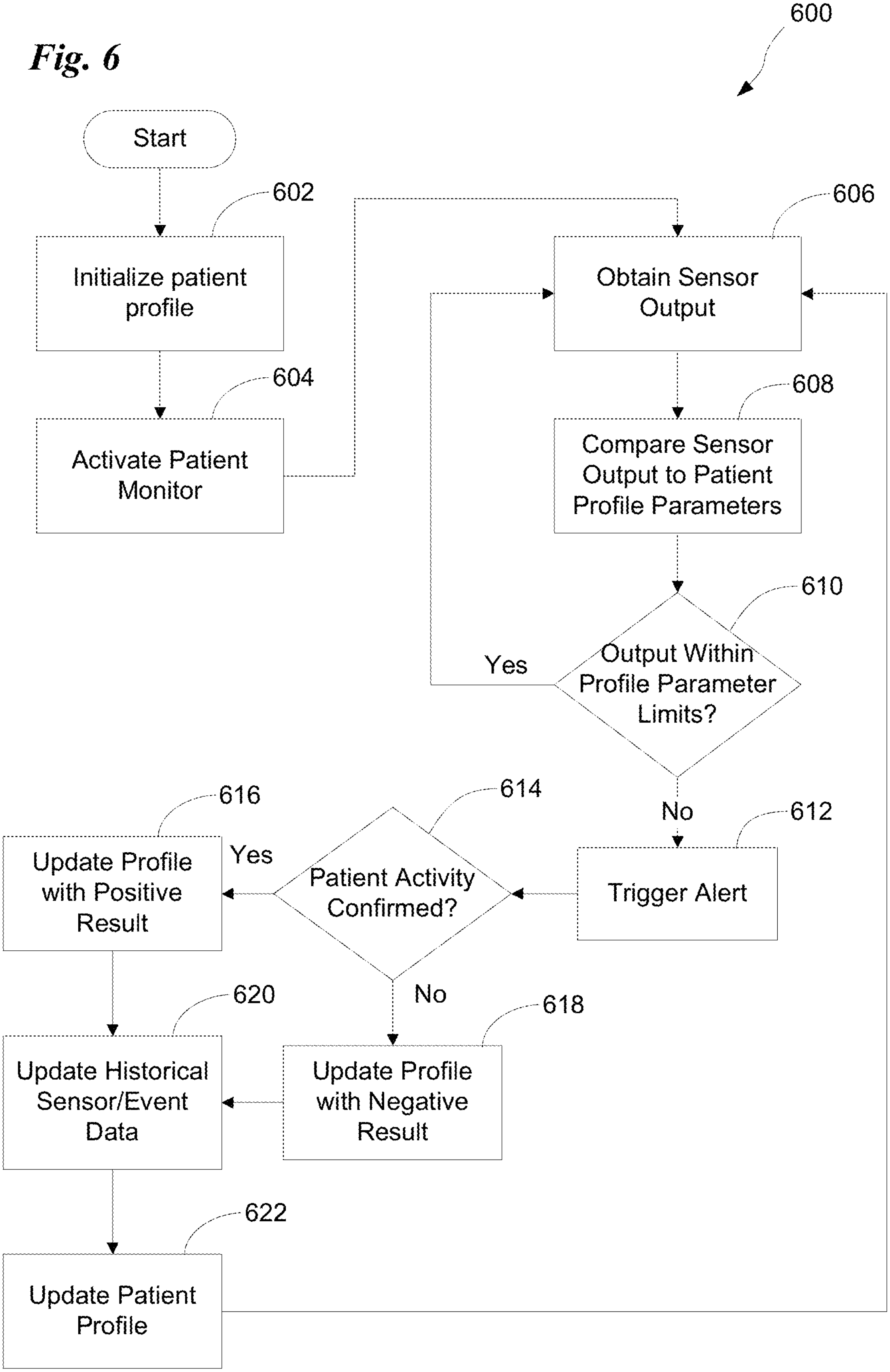
FIG. 6 is a flow chart illustrating actions that may be performed by a patient monitoring system like the system of FIG. 1
Figure 7:
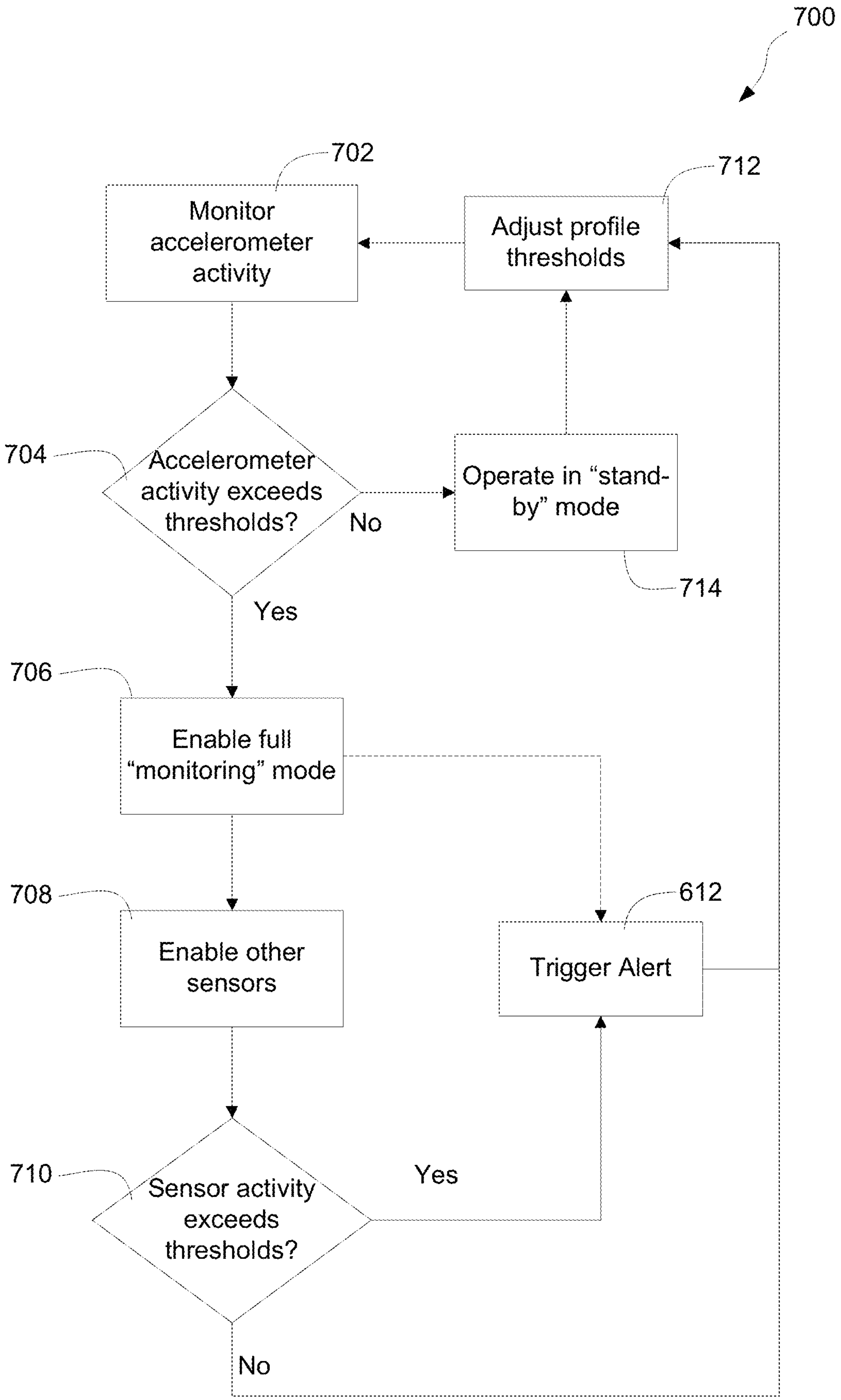
FIG. 7 is a flow chart illustrating actions that may be performed when triggering alerts in a patient monitoring system like the system of FIG. 1

An example of the patient monitoring system in operation is illustrated in FIGS. 6 and 7 at 600 and 700 respectively. At 602, the patient profile is initialized. This may be performed by a caregiver using a computer 106 interacting with server 102 and data store 104. For example, computer 106 may display an access control interface created by user interface module 532 and/or access control module 520. A user's access control credentials may be provided and authenticated against contact information 410 in data store 104.

An initial portion of patient information may be retrieved using patient information module 536 and user interface module 532 may display this information in a profile generation or initialization interface. The profile initialization interface may also be configured to accept input from a user allowing the user to select a default profile based on default profile options provided by patient profile generator module 320 in server 102. A user may provide input selecting a profile and making any adjustments to the default values for the profile parameters to match the parameters to that specific patient and the patient's treatment plan. When ready, the patient profile may be saved to patient data 408 in data store 104, and sent to a patient monitoring device 108.

At 604, the patient monitoring device with the patient's profile may be activated and "installed" or placed in an appropriate location to monitor the patient's activities. Such appropriate locations include any location suitable for monitoring patient activity such as on or adjacent a patient's head, neck, torso, foot, arm, leg or other area. The monitoring device, or parts thereof, may be installed in a bed, chair, or other supporting structure instead of, or in addition to being mounted on the patient. In one example, the monitoring device may be worn by the patient, and at least one of the sensors may be included in the patient's clothing such as in a sock or gown worn by the patient. It may be advantageous to positon the monitoring device, or any of the sensors associated with it, on a patient's extremity such as in a sock worn on a foot, in an armband worn on the wrist, or on the head, knee, or elbow to name a few other non limiting examples. Such a position can result in more noticeable changes in position that may be used to more accurately predict when a patient is making movements that may result in a fall.

When activated, the patient monitoring device 108 may begin obtaining sensor output at 606, and comparing the sensor output to the profile parameters at 608. If the output is within the limits of the parameters at 610, the monitoring device continues monitoring sensor readings taken at 606. These sensor readings may be sent to server 102 and saved to data store 104. Server 102 may transmit the readings to a computer 106 periodically or continuously, or all computers 106 who are configured to retrieve them.

When the output for a sensor falls outside the threshold values defined by the parameters in the patient profile, an alert may be triggered at 612. The alert may be sent from alarm module 226 and received by server 102. Server alarm module 326 may process the alert as discussed above, sending it to the appropriate caregiver's computer 106. User interface module 532 may then display details about the alarm to the respective caregiver(s). If the alarm is confirmed to be valid at 614, the caregiver may provide input to that effect using computer 106. If the alarm is confirmed to be false at 618, the caregiver may acknowledge this as well using computer 106. The system may update the historical sensor and event related data at 620 allowing heuristic module 318 to refine profile parameter settings for future profiles to improve and refine the system's overall knowledge of patient behavior, and/or to better avoid false alarms in the future. Whether the alarm is valid or not, user interface module 532 may provide a caregiver with a profile interface for adjusting a patient's profile parameters. Such adjustments may be made by sending the updated profile to server 102 and monitoring device 108 at 622 and the monitoring activities may continue at 606.

One example of the kinds of comparisons the system makes between the sensor output and the profile parameters in the patient profile is illustrated at 700 in FIG. 7. At 702, the motion sensor in the monitoring device includes an accelerometer. The monitoring device operates in a "low power" or "stand-by" mode monitoring data from the accelerometer to detect movement of the patient which is greater than or equal to a predefined activation threshold. In stand-by mode, the monitoring device may disable other sensors such as gyroscope sensors, pressure sensors, proximity sensors, and the like. The monitoring device may also disable wireless transceivers, network interfaces or other modules that may consume additional power. In this example, as long as the accelerometer activity is less than the activation threshold at 704, the monitoring device maintains the "stand-by" operating mode.

When the accelerometer indicates patient movement that exceeds the activation threshold, the monitoring device moves from "stand-by" mode to "full monitoring" mode at 706. In this mode, additional modules, subsystems, or other aspects of the monitoring device may be enabled. Examples include a network interface may be enabled to allow an alert to be transmitted over the network 110. Other sensors may also be enabled at 708 such as one or more pressure sensors, gyroscopic sensors, proximity sensors, and/or temperatures sensors. By disabling these sensors in "stand-by" mode, the monitoring device can conserve power. If pressure, gyroscope, temperature, or other sensor data exceeds thresholds in the patient profile at 710, the alert is triggered at 612.

Alternatively, the monitoring device may be configured to trigger an alert when the accelerometer data alone has exceeded the threshold.

The pressure sensor may be in a sock worn by the patient, and the pressure sensor may generate a signal that is a time-varying voltage corresponding to the level of pressure the patient is exerting on the sensor. For example, when laying in bed, sitting in a chair, or in some other resting position where pressure is at or near a minimal value, the signal may be less than 800 mV. When the signal is at or near a maximum value for a given patient, such as when the patient is standing, the signal may be over 1800 mV. These values may be tailored specific to a particular patient. For example, a lighter patient, such as a child, may not be heavy enough to generate 1800 mV. Therefore, the profile thresholds may be adjusted accordingly by the server when the profile is initially loaded into the monitoring device, or later by the caregiver using a computer 106 to adjust the values as needed.

The monitoring device may be programmed to perform more complex analysis of the signal data received from the various sensors. Different constant values may be also applied to the sensor data to effectively "weight" certain sensor data, or combinations of sensor data more heavily than others. In one example, the monitoring device samples the signals from motion sensors such as an accelerometer and a gyroscope, as well as signals from a pressure sensor. The data collected for each sample from each sensor may include a single value, or multiple values such as a value for three separate planes orthogonal to one another (e.g. "up/down", "left/right", and "forward/backward"). The values may be combined according to a particular function to calculate a result that may be compared with an alert threshold to determine when the alert threshold has been met or exceeded and a caregiver should be notified.

In one example, the sensors may yield three individual overall acceleration, pressure, and angular moment values for each of n evenly spaced samples at separate times t. These individual values may be weighted using constants $C_1$, $C_2$, and $C_3$, as follows:

$$y(t)=C_1a+C_2g+C_3p$$

where:

t is the time the sample is taken a is the value from the accelerometer at time t g is the value from the gyroscope at time t p is the value from the pressure sensor at a time t In another example, the sensors may yield seven separate values at each time t, six of which represent acceleration a and angular momentum g measured at time t in each of three corresponding directions that are orthogonal to one another (e.g. "up/down", "left/right", and "forward/backward"). The remaining value may be a pressure measurement p measuring pressure exerted by a patient's foot. The data collected might appear as follows:

3-axis Accelerometer data: $a_x$, $a_y$, $a_z$ 3-axis Gyroscope data: $g_\alpha$, $g_\beta$, $g_\gamma$ Pressure data: p An equation combining these values might then be:

$$y(t)=C_1a_x+C_2a_y+C_3a_z+C_4g_\alpha+C_5g_\beta+C_6g_\gamma+C_7p$$

where:

t is the time the sample is taken $a_x$, $a_y$, $a_z$, is the value from the accelerometer in the plane x, y, and z respectively at time t $g_\alpha$, $g_\beta$, $g_\gamma$, is the value from the gyroscope in the plane α, β, and γ respectively at time t p is the value from the pressure sensor at a time t In another example, the sensors may yield nine separate values at each time t representing acceleration a, angular momentum g, and pressure measurement p taken at a time t in each of three corresponding directions that are orthogonal to one another. The data collected may then be as follows:

3-axis Accelerometer data: $a_x$, $a_y$, $a_z$ 3-axis Gyroscope data: $g_\alpha$, $g_\beta$, $g_\gamma$ 3-axis Pressure data: $p_a$, $p_b$, $p_c$ From these data values, a more sophisticated function may be constructed employing many constants C which may be used to apply a more granular weighting to the data from the sensors, or to any permutation or combination of the data. One example of such a function is:

$$y(t)=C_1a_x+C_2a_y+C_3a_z+C_4a_xa_y+C_5a_xa_z+C_6a_ya_z+C_7a_xa_ya_z+C_8g_\alpha+C_9g_\beta+C_{10}g_\gamma+C_{11}g_\alpha g_\beta+C_{12}g_\alpha g_\gamma+C_{13}g_\beta g_\gamma+C_{14}g_\alpha g_\beta g_\gamma+C_{15}p_a+C_{16}p_b+C_{17}p_c+C_{18}p_ap_b+C_{19}p_ap_b+C_{20}p_bp_c+C_{21}p_ap_bp_c$$

Constants $C_1$ through $C_{21}$ can be determined initially by experimentation and analysis to yield an appropriate single value y(t) for any given sampling to predict or report when patient movement exceeds the predetermined thresholds. These constants may be adjusted over time either automatically by the system or by a caregiver to refine when the system reports a "stand" or "fall" event to avoid false readings.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Battery" generally refers to an electrical energy storage device or storage system including multiple energy storage devices. A battery may include one or more separate electrochemical cells, each converting stored chemical energy into electrical energy by a chemical reaction to generate an electromotive force (or "EMF" measured in Volts). An individual battery cell may have a positive terminal (cathode) with a higher electrical potential, and a negative terminal (anode) that is at a lower electrical potential than the cathode. Any suitable electrochemical cell may be used that employ any suitable chemical process, including galvanic cells, electrolytic cells, fuel cells, flow cells and voltaic piles. When a battery is connected to an external circuit, electrolytes are able to move as ions within the battery, allowing the chemical reactions to be completed at the separate terminals thus delivering energy to the external circuit.

A battery may be a "primary" battery that can produce current immediately upon assembly. Examples of this type include alkaline batteries, nickel oxyhydroxide, lithium-copper, lithium-manganese, lithium-iron, lithium-carbon, lithium-thionyl chloride, mercury oxide, magnesium, zinc-air, zinc-chloride, or zinc-carbon batteries. Such batteries are often referred to as "disposable" insofar as they are generally not rechargeable and are discarded or recycled after discharge.

A battery may also be a "secondary" or "rechargeable" battery that can produce little or no current until charged. Examples of this type include lead-acid batteries, valve regulated lead-acid batteries, sealed gel-cell batteries, and various "dry cell" batteries such as nickel-cadmium (NiCd), nickel-zinc (NiZn), nickel metal hydride (NiMH), and lithium-ion (Li-ion) batteries.

"Beacon" or "beacon transmitter" generally refers to a system or apparatus configured to transmit data using electromagnetic energy. The broadcasted data may include any suitable data such as a string of alphanumeric characters uniquely identifying one beacon from others in the environment. Data may appear in a single field in a datagram, or in multiple separate fields. Any suitable protocol may be used to create and transmit the datagrams using any suitable arrangement of fields. The fields may include predetermined numbers of bits according to proprietary or commercially available protocols. One example of a commercially available protocol is the Bluetooth® LE (Low Energy) protocol, also referred to as Bluetooth® Smart protocol.

Datagrams may include one or more fields that may include a preamble, one or more header fields, an access address field, a Cyclical Redundancy Check (CRC) field, a Protocol Data Unit (PDU) field, a Media Access Control (MAC) address field, and a data field. The data field may include an prefix and a proximity Universal Unique Identifier (UUID) which may be configured to distinguish beacons used by one organization from those of another organization. Other data fields may include a major field which may be used to identify multiple beacons as a group, a minor field which may uniquely identify a specific beacon within a group, and a transmission power field which may indicate how far a beacon is from a receiver. The transmitter power field may include one of a set of data values representing distance ranges such as "immediate", "far", or "out of range". A transmission power field may also include more detailed ranging data such as the Received Signal Strength Indication (RSSI) of the beacon at a predetermined range such as 1 meter away. This value may be compared to a current RSSI measured by a receiver and used to calculate an approximate range.

A beacon may include a receiver allowing the beacon to begin broadcasting after receiving a signal from another transmitter. In one example, a beacon may collect energy from the electromagnetic energy directed toward it and may use this energy to transmit its data in response. This type of "passive" beacon may only transmit when energized to do so by some other transmitter. In another example, beacons may have a local power source such as a battery and may transmit continuously and/or at predetermined intervals. In either case, the data sent by the beacon may pass through walls or other objects between the beacon and a receiver making it unnecessary to maintain an unobstructed line of sight between the to.

A beacon may transmit on any suitable frequency or group of frequencies in the electromagnetic spectrum. For example, a beacon may transmit in the Very High Frequency range (VHF), the Ultra High Frequency range (UHF), or in the Super High Frequency range (SHF). Transmissions from a beacon may be directed along a narrow beam by a directional antenna system used by the beacon, or the beacon may use an omnidirectional antenna system configured to broadcast the data in all directions at about the same time.

The data may be programmed in a memory such as a nonvolatile memory in the beacon for repeated transmission at predetermined intervals. For example, transmissions may be repeated up to about every 500 ms, up to about every 2 seconds, up to about every 30 seconds, or at intervals greater than 30 seconds apart. Beacons may transmit at a very low Transmitter Power Output (TPO) and/or Effective Radiated Power (ERP). TPO or ERP may be less than about 100 milliwatts, less than about 10 milliwatts, or less than about 1 milliwatt.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal minor display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Electromagnetic Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to radio waves, visible and invisible light, X-rays, and gamma-rays.

"Input Device" generally refers to any device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Location Finding System" generally refers to a system that tracks the location of objects or people in real time. Such systems include space based systems like the Global Positioning System (GPS) which may use a receiver on earth in communication with multiple satellite mounted transmitters in space. Such systems may use time and the known position of the satellites to triangulate a position on earth. The satellites may include accurate clocks that are synchronized to each other and to ground clocks. The satellites may be configured to continuously transmit their current time and position. The ground-based receiver may monitor multiple satellites solving equations in real time to determine the precise position of the receiver. Signals from four satellites may be required for a receiver to make the necessary computations.

In another example sometimes referred to as "Real-time Locating Systems" (RTLS), wireless tags are attached to objects or worn by people. Receivers maintained at known, fixed reference points may receive wireless signals from the tags and use signal strength information to determine their location.

The tags may communicate using electromagnetic energy which may include radio frequency (RF) communication, optical, and/or acoustic technology instead of or in addition to RF communication. Tags and fixed reference points can be transmitters, receivers, or both. Location information may or may not include speed, direction, or spatial orientation, and may in some cases be limited to tracking locations of objects within a building or contained area.

Wireless networking equipment may be engaged as well. In one example, known signal strength readings may be taken in different locations serviced by a wireless network such as in 802.11 Wi-Fi network. These known signal strength readings may be used to calculate or triangulate approximate locations by comparing measured signal strength received from a tag against a stored database of Wi-Fi readings or Received Signal Strength Indicators (RSSI). In this way, one or more probable locations may be indicated a virtual map.

In another example, a wireless network transmitter may be configured to send reference signal strength information in packets or datagrams received by the tags. The tags may be configured to measure and/or calculate the actual signal strength of the signal received from the sending transmitter and compare this actual signal strength to reference signal strength information to determine an approximate distance from the transmitter. This distance information may then be sent to other servers or components in the location finding system and used to triangulate a more precise location for a given tag.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Motion Sensor" generally refers to a device configured to convert physical movement of an object into an electrical or signal. A motion sensor may be thought of as a transducer detecting physical movement and from it producing a signal (e.g. a time varying signal) based on that movement. A motion sensor may operate by detecting changes in its position relative to other objects by emitting and/or detecting electromagnetic waves. Examples include ultrasonic, infrared, video, microwave, or other such motion detectors.

In another example, a motion sensor may operate by detecting changes in the magnitude and direction of proper acceleration caused by gravity ("g-force"). Sometimes called "accelerometers," these motion sensors can detect changes in g-forces on an object as a vector quantity, and can be used to sense changes in orientation (e.g. when the direction of weight changes), coordinate acceleration (e.g. when it produces g-force or a change in g-force), vibration, shock, and/or falling in a resistive medium. An accelerometer may thus be used to detect changes in the position, orientation, and movement of a device.

Commercially available accelerometers include piezoelectric, piezoresistive and capacitive components. Piezoelectric accelerometers may rely on piezoceramics (e.g. lead zirconate titanate) or single crystals (e.g. quartz, tourmaline). Piezoresistive accelerometers may be preferred in high shock applications. Capacitive accelerometers may use a silicon micro-machined sensing element.

A motion sensor may include multiple accelerometers. Some accelerometers are designed to be sensitive only in one direction. A motion sensor sensitive to movement in more than one direction may be constructed by integrating two accelerometers perpendicular to one another within a single package. By adding a third device oriented in a plan orthogonal to two other axes, three axes can be measured.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eye glasses, watches, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, California, USA. Other examples of commercially available processors include but are not limited to the X8 and Freescale Coldfire processors made by Motorola Corporation of Schaumburg, Illinois, USA; the ARM processor and TEGRA System on a Chip (SoC) processors manufactured by Nvidia of Santa Clara, California, USA; the POWER7 processor manufactured by International Business Machines of White Plains, New York, USA; any of the FX, Phenom, Athlon, Sempron, or Opteron processors manufactured by Advanced Micro Devices of Sunnyvale, California, USA; or the Snapdragon SoC processors manufactured by Qalcomm of San Diego, California, USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Proximity Sensor" generally refers to a sensor configured to generate a signal based on distance to a nearby object, or "target", generally without requiring physical contact. Lack of mechanical physical contact between the sensor and the sensed object provides the opportunity for extra reliability and long functional life.

A proximity sensor may emit an electromagnetic field or a beam of electromagnetic radiation (e.g. infrared light, for instance), and the sensor may determine proximity based on changes in the field or return signal. The object being sensed is often referred to as the "target" or "sensor target". Different proximity targets demand different sensors. For example, a capacitive or photoelectric sensor might be suitable for a plastic target; an inductive proximity sensor may require a metallic target.

The maximum distance that a proximity sensor can detect the target is defined as the sensor's "nominal range". A sensor may begin to emit a signal, or may change the signal already emitted when the distance from the target to the sensor exceeds the nominal range. Some sensors allow for adjustments to the nominal range, or may be configured to return an analog or digital time varying signal based on changes on the distance to the target in time.

"Receive" generally refer system be sent to the monitoring system s to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

“Receiver” generally refers to a device configured to receive, for example, digital or analog signals carrying information via electromagnetic energy. A receiver using electromagnetic energy may operate with an antenna or antenna system to intercept electromagnetic waves passing through a medium such as air, a conductor such as a metallic cable, or through glass fibers. A receiver can be a separate piece of electronic equipment, or an electrical circuit within another electronic device. A receiver and a transmitter combined in one unit are called a “transceiver”.

A receiver may use electronic circuits configured to filter or separate one or more desired radio frequency signals from all the other signals received by the antenna, an electronic amplifier to increase the power of the signal for further processing, and circuits configured to demodulate the information received.

Examples of the information received include sound (an audio signal), images (a video signal) or data (a digital signal). Devices that contain radio receivers include television sets, radar equipment, two-way radios, cell phones and other cellular devices, wireless computer networks, GPS navigation devices, radio telescopes, Bluetooth enabled devices, garage door openers, and/or baby monitors.

“Rule” generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an “if/then/else” statement that may be coded in a programming language and executed by a processor in a computer:

```
if(clouds.areGrey( ) and
(clouds.numberOfClouds > 100)) then
{
    prepare for rain;
} else {
    Prepare for sunshine;
}
```

“Sensor” generally refers to a transducer configured to sense or detect a characteristic of the environment local to the sensor. For example, sensors may be constructed to detect events or changes in quantities or sensed parameters providing a corresponding output, generally as an electrical or electromagnetic signal. A sensor’s sensitivity indicates how much the sensor’s output changes when the input quantity being measured changes.

“Sense parameter” generally refers to a property of the environment detectable by a sensor. As used herein, sense parameter can be synonymous with an operating condition, environmental factor, sensor parameter, or environmental condition. Sense parameters may include temperature, air pressure, speed, acceleration, the presence or intensity of sound or light or other electromagnetic phenomenon, the strength and/or orientation of a magnetic or electrical field, and the like.

“Short Message Service (SMS)” generally refers to a text messaging service component of phone, Web, or mobile communication systems. It uses standardized communications protocols to allow fixed line or mobile phone devices to exchange short text messages. Transmission of short messages between a Short Message Service Center (SMSC) and personal computing device is done whenever using the Mobile Application Part (MAP) of the SS7 protocol. Messages payloads may be limited by the constraints of the signaling protocol to precisely 140 octets (140 octets*8 bits/octet=1120 bits). Short messages can be encoded using a variety of alphabets: the default GSM 7-bit alphabet, the 8-bit data alphabet, and the 16-bit UCS-2 alphabet. Depending on which alphabet the subscriber has configured in the handset, this leads to the maximum individual short message sizes of 160 7-bit characters, 140 8-bit characters, or 70 16-bit characters.

“Transmit” generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To “transmit” may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

Information such as a signal provided to the transmitter may be encoded or modulated by the transmitter using various digital or analog circuits. The information may then be transmitted. Examples of such information include sound (an audio signal), images (a video signal) or data (a digital signal). Devices that contain radio transmitters include radar equipment, two-way radios, cell phones and other cellular devices, wireless computer networks and network devices, GPS navigation devices, radio telescopes, Radio Frequency Identification (RFID) chips, Bluetooth enabled devices, and garage door openers.

“Transmitter” generally refers to a device configured to transmit, for example, digital or analog signals carrying information via electromagnetic energy. A transmitter using electromagnetic energy may operate with an antenna or antenna system to produce electromagnetic waves passing through a medium such as air, a conductor such as a metallic cable, or through glass fibers. A transmitter can be a separate piece of electronic equipment, or an electrical circuit within another electronic device. A transmitter and a receiver combined in one unit are called a “transceiver”.

“Triggering a Rule” generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

What is claimed is:

1. A system, comprising:

a sock that includes one or more pressure sensors adapted and arranged to detect pressure applied to the sock;

a monitoring device having one or more movement sensors that are configured to detect movement;

wherein the monitoring device is electrically connected to the one or more pressure sensors and is responsive to the pressure sensors and the one or more movement sensors; and wherein the monitoring device transmits pressure and movement data via a communication link to a remote computing device.

2. The system of claim 1, wherein the pressure sensors of the sock are integrated into at least a portion of the sock.

3. The system of claim 1, wherein the monitoring device begins processing input from the pressure sensors and/or the movement sensors when movement measured by at least one sensor of the movement sensors exceeds a predetermined activation threshold.

4. The system of claim 1, wherein the monitoring device is configured to calculate a triggering value by combining the movement with changes in pressure detected by the pressure sensors.

5. The system of claim 4, wherein the monitoring device calculates a partial result by multiplying movement in a first plane of motion together with separate movement in a second plane of motion that is different than the first plane of motion.

6. The system of claim 5, wherein the monitoring device configured to multiply the partial result by a weighting factor stored in a patient profile of the monitoring device.

7. The system of claim 6, wherein the weighting factor is automatically adjusted by the monitoring device.

8. The system of claim 1, wherein the pressure and movement data is used to generate an alert message that is relayed to a caregiver by the remote computing device, or by an alert computer that is separate from the remote computing device.

9. The system of claim 1, wherein the one or more movement sensors include a gyroscope sensor detecting changes in angular velocity, and an accelerometer detecting changes in acceleration.

10. The system of claim 1, wherein the monitoring device stops processing data received from the one or more movement sensors when input from the movement sensors remains at or below a predetermined activation threshold for a predetermined period of time.

11. The system of claim 1, wherein the monitoring device is configured to generate an alert message when values in the movement data exceed a predetermined alert threshold.

12. The system of claim 1, wherein the monitoring device is configured to calculate a triggering value based on input from the pressure sensors, and/or the movement sensors.

13. The system of claim 12, wherein the monitoring device is configured to broadcast an alert message when the triggering value exceeds a predetermined alert threshold.

14. A method, comprising:

detecting pressure applied to a sock, wherein the sock includes one or more pressure sensors adapted and arranged to detect pressure applied to the sock;

detecting movement using one or more movement sensors in a monitoring device mounted on the sock, wherein the monitoring device is electrically connected to the one or more pressure sensors and is responsive to the pressure sensors and the one or more movement sensors; and transmitting pressure and movement data via a communication link to a remote computing device.

15. The method of claim 14, comprising:

processing the pressure and movement data to calculate a triggering value using the monitoring device; and comparing the triggering value to one or more alert threshold values using the monitoring device.

16. The method of claim 15, wherein calculating the triggering value includes combining data from the movement sensors with data from the pressure sensors.

17. The method of claim 14, comprising:

generating an alert message when values in the movement data exceed a predetermined alert threshold.

18. The method of claim 14, wherein the pressure sensors of the sock are integrated into at least a portion of the sock.

19. The method of claim 14, wherein the pressure sensors include conductive threads woven into the sock that change resistance according to the pressure applied to the sock.

20. The method of claim 14, comprising:

activating the monitoring device to process data from the movement and pressure sensors when movement detected by the monitoring device exceeds a predetermined activation threshold.

21. The method of claim 14, wherein combining data from the movement and pressure sensors comprises:

calculating a partial result by multiplying movement in a first plane of motion together with separate movement in a second plane of motion that is different than the first plane of motion.

22. The method of claim 14, wherein the movement sensors include at least one of a gyroscope sensor or an accelerometer, the movement sensors detecting motion along three separate independent axes of rotation.

23. The method of claim 14, comprising:

applying the sock to a foot of a patient; and coupling the monitoring device to the sock.

24. The method of claim 14, deactivating the monitoring device to stop processing input from the movement sensors and the pressure sensor when the data from the movement sensors has remained less than or equal to an activation threshold for greater than a predetermined activation timeout.

* * * * *